United States Patent
Oddo et al.

(10) Patent No.: US 12,242,614 B2
(45) Date of Patent: Mar. 4, 2025

(54) SYSTEMS AND METHODS FOR EVALUATING SYSTEM-OF-SYSTEMS FOR CYBER VULNERABILITIES

(71) Applicants: Louis A. Oddo, San Diego, CA (US); Charles Connors, Santee, CA (US); Kenneth F. McKinney, San Diego, CA (US)

(72) Inventors: Louis A. Oddo, San Diego, CA (US); Charles Connors, Santee, CA (US); Kenneth F. McKinney, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 362 days.

(21) Appl. No.: 17/674,565

(22) Filed: Feb. 17, 2022

(65) Prior Publication Data
US 2023/0259633 A1   Aug. 17, 2023

(51) Int. Cl.
*G06F 21/57*   (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 10,127,125 | B2* | 11/2018 | Krishnan | G06F 11/0751 |
| 10,944,758 | B1* | 3/2021 | Nagargadde | G06F 21/6218 |
| 11,652,839 | B1* | 5/2023 | Aloisio | H04L 63/1433 |
| | | | | 726/25 |
| 2018/0004948 | A1* | 1/2018 | Martin | H04L 63/1425 |
| 2018/0183827 | A1* | 6/2018 | Zorlular | H04L 63/1416 |

(Continued)

OTHER PUBLICATIONS

El Hachem, et al.: "Using Bayesian Networks for a Cyberattacks PropagationAnalysis in Systems-of-Systems", 2019 26th Asia-Pacific Software Engineering Conference (APSEC), IEEE, Dec. 2, 2019 (Dec. 2, 2019), pp. 363-370 (Year: 2019).*

(Continued)

*Primary Examiner* — Bassam A Noaman
(74) *Attorney, Agent, or Firm* — Tarolli, Sundheim, Covell & Tummino LLP

(57) ABSTRACT

Systems and methods for evaluation of system-of-systems (SoS) architectures for cyber vulnerabilities. Architecture definition file (ADF) data can be generated based on received architecture and component description data. A model of a target SoS architecture for the SoS can be generated based on the ADF data. The target SoS architecture for the SoS can be evaluated to identify potential cyber-attack vectors with respect to the target SoS architecture, and a probabilistic analysis of the potential cyber-attack vectors can be executed to compute a probability for each cyber-attack vector indicative of a likelihood that a respective cyber-attack results in a mission failure by the SoS based on the target SoS architecture. Display data can be generated for visualization on an output device that includes each identified potential cyber-attack vector and associated computed probability.

18 Claims, 10 Drawing Sheets

(56) References Cited

U.S. PATENT DOCUMENTS

2021/0258334 A1  8/2021  Sayag et al.

OTHER PUBLICATIONS

Edan Habler and Asaf Shabtai, "Analyzing Sequences of Airspace States to Detect Anomalous Traffic Conditions," Nov. 11, 2021, Ben-Gurion University of the Negev, Beer-Sheva, Israel, 1847, 1848, 1850 and 1851 (Year: 2021).*

Vincent Andersen, Erin Collins, Tom Daniels, Jensen Hughes and Josh Kaffel, "Data and Predictive Modeling for Aerospace Mission Critical Parameter Assessment," Jan. 24-27, 2022, IEEE, p. 1 and 4 (Year: 2022).*

Data and Predictive Modeling for Aerospace Mission Critical Parameter Assessment (Year: 2022).*

El Hachem, et al.: "Using Bayesian Networks for a Cyberattacks Propagation Analysis in Systems-of-Systems", 2019 26th Asia-Pacific Software Engineering Conference (APSEC), IEEE, Dec. 2, 2019 (Dec. 2, 2019), pp. 363-370, XP033682827, DOI: 10.1109/APSEC48747.2019.00056 [retrieved on Dec. 30, 2019] p. 366, left-hand column.

Olivero, et al.: "Security Assessment of Systems of Systems", 2019 IEEE/ACM 7th International Workshop on Software Engineering for Systems-of-Systems (SESOS) and 13th Workshop on Distributed Software Development, Software Ecosystems and Systems-of-Systems (WOES), IEEE, May 28, 2019 (May 28, 2019), pp. 62-65, XP033650902, DOI: 10.1109/SESOS/WDES.2019.00017 [retrieved on Oct. 24, 2019].

International Search Report (ISR) for corresponding PCT/US2023/010868, mailed Apr. 28, 2023.

* cited by examiner

| SIMULATION SUMMARY | | COMPONENT SYSTEM | | | | COMMUNICATION LINK | | | |
|---|---|---|---|---|---|---|---|---|---|
| RUN | PASS/FAIL | ENTRY POINT | A | B | C | D | A::B | B::C | B::D | b1::b3 |
| 1 | PASS | A | V | | | | V | | | |
| 2 | FAIL | B | | C | V | C | | V | V | V |
| 3 | PASS | C | | V | V | C | | V | V | |
| 4 | FAIL | D | | C | | C | | | V | V |

V = VISITED  C = COMPROMISED

FIG. 7

| Component Systems | Role | Domain | LOS Comms | | | BLOS Comms | | | Vehicle | |
|---|---|---|---|---|---|---|---|---|---|---|
| | General | | Type 1 | Type 2 | Type 3 | Type 1 | Type 2 | Type 3 | GPS (encrypted) | GPS (unencrypted) |
| Ground Station | C2 | Ground | x | | | x | | | | |
| Aircraft 1 | Relay | Air | x | | | x | x | | x | |
| Aircraft 2 | Other | Air | x | | | | | x | x | |
| Satellite 1 | ISR | Space | | | | | x | | | x |
| Satellite 2 | GPS | Space | | | | | | x | | x |

| Subsystem | Component | Cyber-Event | Severity |
|---|---|---|---|
| A | - | V | M |
| B | b1 | V | M |
| B | b2 | V | M |
| B | b3 | C | F |
| C | - | V | M |
| D | - | V | M |
| V = VISITED | | | M = MINOR |
| C = COMPROMISED | | | F = FAILURE |

FIG. 11

SYSTEMS AND METHODS FOR EVALUATING SYSTEM-OF-SYSTEMS FOR CYBER VULNERABILITIES

TECHNICAL FIELD

This disclosure relates to system-of-systems (SoS) architectures and more particularly to an evaluation of SoS architectures for cyber vulnerabilities.

BACKGROUND

A SoS is a collection of systems, each capable of independent operation, that interoperate together to achieve additional desired capabilities. A key part of system engineering for SoS is the composition of systems to meet SoS needs. This can include simply interfacing systems and leveraging their existing functionality or it may require changing the systems functionality, performance, or interfaces. These changes occur incrementally, and the SoS can evolve over time to meet changing SoS objectives. System of Systems Engineering supports these changes by developing and evolving a technical framework that acts as an overlay to the systems of which the SoS is composed. This framework provides an architecture for the SoS. The SoS architecture defines how the systems work together to meet SoS objectives and considers the details of the individual systems and their impact on SoS performance or functionality.

SUMMARY

The present disclosure relates to an analysis of SoS architectures for cyber vulnerabilities.

In an example, a computer implemented method can include receiving architecture description data and component description data for an SoS, generating architecture definition file (ADF) data based on the architecture and component description data, generating a model of a target SoS architecture for the SoS based on the ADF data, evaluating the target SoS architecture for the SoS to identify one or more potential cyber-attack vectors with respect to the target SoS architecture, executing a probabilistic analysis of the potential cyber-attack vectors to compute a probability for each cyber-attack vector indicative of a likelihood that a respective cyber-attack results in a mission failure by the SoS based on the target SoS architecture, and generating output graphical user interface (GUI) display data for visualization on an output device, the GUI display data including each identified potential cyber-attack vector and associated computed probability.

In yet another example, a system can include memory to store machine-readable instructions. The system can include one or more processors to access the memory and execute the machine-readable instructions. The machine-readable instructions can include a vulnerability analyzer that can include an ADF parser, an attack vector identifier, and an attack vector analyzer. The ADF parser can be programmed to generate a model of a target SoS architecture for an SoS based on the ADF data. The attack vector identifier can be programmed to evaluate the target SoS architecture for the SoS to identify one or more potential cyber-attack vectors with respect to the target SoS architecture. The attack vector analyzer can be programmed to execute a probabilistic analysis of the potential cyber-attack vectors to compute a probability for each cyber-attack vector indicative of a likelihood that a respective cyber-attack results in a mission failure by the SoS based on the target SoS architecture. At least one identified potential cyber-attack vector can be eliminated by updating the target SoS architecture for the SoS based on the associated computed probability for the at least one identified potential cyber-attack vector, such that the SoS implemented based on the updated target SoS architecture has a reduced vulnerability to a cyber-attack than the SoS implemented based on the target SoS architecture.

In a further example, a non-transitory machine-readable medium can include machine-readable instructions that can include an ADF generator and a vulnerability analyzer. The ADF generator can generate ADF data based on architecture and component description data for a target SoS architecture. The vulnerability analyzer can generate a model of the target SoS architecture for an SoS based on the ADF data, evaluate the target SoS architecture for the SoS to identify one or more potential cyber-attack vectors with respect to the target SoS architecture and execute a probabilistic analysis of the potential cyber-attack vectors to compute a probability for each cyber-attack vector indicative of a likelihood that a respective cyber-attack results in a mission failure by the SoS based on the target SoS architecture. The vulnerability analyzer can further rank-order each computed probability for each cyber-attack vector to generate a rank-ordering list to identify a given cyber-attack vector that is most likely to cause the SoS implemented based on the target SoS to fail an objective.

BRIEF DESCRIPTION OF THE DRAWINGS

FIG. 7 illustrates a cyber-attack vulnerability summary table.

FIG. 8 is an example of a partial component description table.

FIG. 11 illustrates an example of a Failure Mode Effects Analysis (FMEA) table.

DETAILED DESCRIPTION

Figure 1:
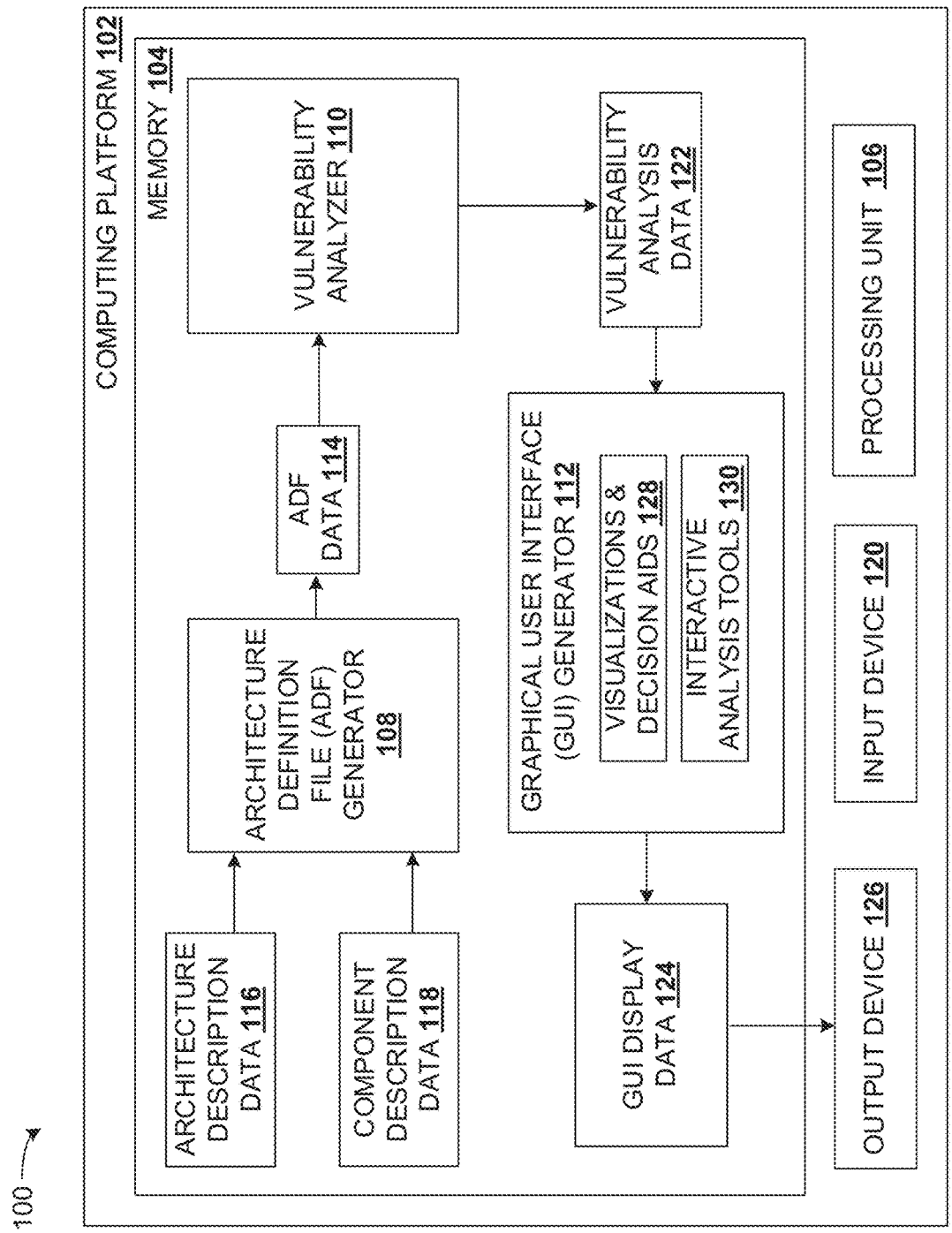
FIG. 1 illustrates an example of a system for analyzing an SoS architecture for cyber-attack vulnerabilities.

Current approaches for analyzing cyber vulnerabilities of SoS architectures for an SoS are ad-hoc. For example, in communication system development, a type of SoS architecture, existing approaches rely on subject matter experts and employ rule-based heuristics such as minimizing a number of communications links and minimizing a number of message hops between a sender and a receiver. These heuristic-based methods make no attempt to identify possible or potential cyber-attack vectors or to quantify a severity of a cyber vulnerability of a target SoS architecture for an SoS. The term "cyber-attack vector" and its derivatives as used herein can refer to one or more attack paths through an SoS. A cyber-attack vector can identify an entry point of the SoS that can be exploited (e.g., by an external system, or an unwanted user, such as a hacker) to gain unauthorized access to the SoS. The entry point for example can be a system, a component, or a subsystem of the SoS. The cyber-attack vector can further identify a pathway through the SoS, and in some instances to a critical system, component, and/or subsystem of the SoS, which if compromised, will impede or undermine a mission of the SoS.

The examples described herein allow for analyzing SoS architectures for SoS to identify potential cyber-attack vectors in the SoS based on an SoS architecture and quantification of cyber SoS vulnerabilities. A metric-based analysis as described herein can be used to compute a likelihood of cyber-attack success and in some instances a likelihood of mission success or failure of the SoS based on the SoS architecture for each potential cyber-attack vector. For example, if the SoS is a communication system, the objective or mission of the communication system may be to allow communications between one or more various devices, vehicles (e.g., air or ground vehicles), satellites, etc. that rely on the communication systems to exchange data, information, and the like.

The metric-based analysis described herein can allow for a comparison of a robustness of one SOS architecture versus another SoS architecture for the SoS and allow for identification of a more secure SoS architecture for the SoS as well as a relative measure of how much more secure one alternative SoS architecture is than another. Thus, the systems and methods described herein allow for the identification and implementation of more secure alternative SoS architectures for the SoS that would not be able to be identified by users (e.g., system engineers) during an SoS design phase. Accordingly, a desired amount of cyber-attack robustness can be weighed against a cost of designing a more robust target SoS architecture for the SoS in accordance with the systems and methods described herein.

Moreover, in some instances, the systems and methods described herein can include rank ordering of all potential cyber-attack vectors for the SoS, such that a priority SoS architecture determination can be made (e.g., by another system or user). The priority determination can include determining a priority in which to address each potential cyber vulnerability for the SoS and in some instances determining if a cyber vulnerability should be addressed by an architecture change or managed as a risk (e.g., using real-time security monitoring software, such as cyber-attack monitoring software in a field once the SoS is deployed based on the SoS architecture).

Accordingly, in some instances, cyber-attack monitoring tools or software may be eliminated for a system or system component of the SoS, or a number of cyber threats to the SoS may be reduced during deployment as potential cyber vulnerabilities of the SoS can be identified in an SoS design phase by the systems and methods described herein. The potential cyber vulnerabilities identified according to the systems and method described herein can be mitigated by users in the SoS design phase based on data provided according to the examples described herein. Moreover, the data generated according to the systems and methods described herein can be used to design a real-time cyber-attack monitoring system for the system of the SoS based on the SoS architecture.

According to the systems and methods described herein data structures can be generated that enable a vulnerability analyzer to identify potential cyber-attack vectors that can result in prohibiting the SoS based on a target SoS architecture from achieving a target objective. In some instances, the target objective is a mission, and thus the potential cyber-attack vectors can result in the SoS based on the target SoS architecture failing the mission. The vulnerability analyzer can analyze the target SoS architecture for the SoS to compute a probabilistic vulnerability model for the target SoS architecture's cyber vulnerabilities. The probabilistic vulnerability model can be generated to enable comparison of a robustness of one target SoS architecture versus another (e.g., for identification of a more secure target SoS architecture) as well as a relative measure of how much more secure one alternative target SoS architecture is than another.

For example, an ADF generator can generate ADF data based on architecture and component description data for the target SoS architecture. The ADF data can include identification of all component systems of the target SoS architecture, a connectivity of component systems with each other, and connectivity of internal elements of each component system, such as component subsystems. In some instances, not all component subsystems of the target SoS architecture need to be specified to a same level of detail. Such a multi-level fidelity definition scheme permits analysis of specific portions of target SoS architectures wherein portions of the target SoS architecture have yet to be defined. As such, focused analysis of specific threats to the SoS based on the target SoS architecture can be implemented without requiring a user to define in detail an entire target SoS architecture, which could be quite large and complex, and with large portions of the target SoS architecture having little to do with component analysis for potential cyber-attack vulnerabilities.

In addition to connectivity information, the ADF data can describe one or more mission critical subsystems in the target SoS architecture and respective failure modes. A subsystem in the target SoS architecture can be referred to as a mission critical subsystem if failure of such subsystem would result in a mission failure of the SoS based on the target SoS architecture. A mission failure is a type of failure in the SoS based on the target SoS architecture that inhibits, degrades, or causes the SoS to not be able to carry out its intended purpose. For example, consider a target SoS architecture that performs inventory control and order fulfillment for a product that has production, storage, and distribution across the globe—that is the architecture's mission. Consider that this target SoS architecture also has a globally distributed network of message processors that route all message traffic for the architecture across the globe. If this network of message processors were compromised by a cyber-attack such that it could no longer relay messages within the target SoS architecture the architecture would cease to function. The cessation of the target SoS architecture's function is considered to be a mission failure and the network of message processors would be considered a critical mission subsystem.

In some instances, the ADF data can describe combinations of mission critical subsystems and respective failure modes. Failure modes of the one or more mission critical subsystems are identified during the compilation of the architecture description data and component description data and can be automatically encoded into an internal failure model data structure by the ADF generator. Failure mode data can be captured for example in an FMEA table (or in a different form) that can be ingested by the ADF generator and automatically encoded into an internal failure model data structure for use by the vulnerability analyzer. In some instances, if cost data (absolute or relative) is available for components of a system it can be included in the ADF data as part of the definition of each component enabling cost tradeoff analysis.

As used herein, the term "target SoS architecture" is used to identify a SoS architecture for a SoS (e.g., a communication system) to be analyzed by the systems and methods described herein. During vulnerability analysis, one may choose to explore the effects of modifications to the target architecture in a search for improved robustness. These modifications to the target architecture are called architectural SoS variants or updated target SoS architectures for the SoS. In some instances, the target SoS architecture can be aggregates of multiple component systems each built by different vendors, performing different mission functions, achieving different goals, and having different interfaces. As an aggregate, the target SoS architecture may exhibit desired emergent behaviors that are not embodied by any of the individual component systems alone. In some examples, the systems and methods used herein can be used on a single system consisting of multiple subsystems each contributing to the functionality of the system. The concept of vulnerability analysis described herein applies equally to the analysis of a single system architecture as to a target SoS architecture. Moreover, the systems and methods described herein can be used for any type of software architecture from high-level SoS architectures down to circuits or computer programs. For example, any system composed of multiple sub-components wherein the individual sub-components contribute to the overall function of the system can be considered as a target architecture for vulnerability analysis according to the systems and methods described herein.

FIG. 1 illustrates an example of a system 100 for analyzing a target SoS architecture for an SoS for cyber-attack vulnerabilities. The system 100 can evaluate the target SoS architecture to identify potential cyber vulnerabilities in the SoS architecture and thus the SoS based on such architecture and in some instances a level of threat that such vulnerabilities pose to the SoS (e.g., whether a cyber threat causes an objective failure). The target SoS architecture for the SoS can be updated to mitigate said cyber threats to provide an updated SoS architecture for the SoS based on the cyber threat vulnerabilities identified by the system 100. Thus, the SoS implemented based on the updated SoS architecture can have a reduced number of cyber vulnerabilities in comparison to an SoS based on the target SoS architecture. Accordingly, the system 100 can be used to improve an overall performance of the SoS, for example, by reducing cyber vulnerabilities in the SoS and/or reducing or eliminating cyber-attack monitoring tools or software.

The system 100 includes a computing platform 102. The computing platform 102 can include memory 104 for storing machined readable instructions and data and a processing unit 106 for accessing the memory 104 and executing the machine-readable instructions. The memory 104 represents a non-transitory machine-readable memory (or other medium), such as random access memory (RAM), a solid state drive, a hard disk drive, or a combination thereof. The processing unit 104 can be implemented as one or more processor cores. The computing platform can include an output device 108 (e.g., a display) for rendering graphical user interface (GUI) data as described herein. The computing platform 102 could be implemented in a computing cloud. In such a situation, features of the computing platform 102, such as the processing unit 106 and the memory 104 could be representative of a single instance of hardware or multiple instances of hardware with applications executing across the multiple instances (e.g., distributed) of hardware (e.g., computers, routers, memory, processors, or a combination thereof). Alternatively, the computing platform 102 could be implemented on a single dedicated server or workstation.

The processing unit 106 can access the memory 104 to execute an architecture definition file (ADF) generator 108, a vulnerability analyzer 110, and a GUI generator 112. The ADF generator 108 can be programmed to provide ADF data 114. The ADF data 114 can characterize or describe the target SoS architecture. For example, the ADF data 114 can include target architecture definitions and constituent component definitions. The ADF data 114 can have a data format so that the ADF data 114 can be ingested (e.g., processed) by the vulnerability analyzer 110. Because SoS architectures are characterized from one or more viewpoints in varying formats with knowledge distributed among multiple SoS architects, the ADF generator 108 can be programmed to compile data (e.g., architecture description data 116 and/or a component description data 118) into a common format for processing by the vulnerability analyzer 110, as described herein.

For example, the ADF generator 108 can be programmed to receive target architecture description data 116 and component description data 118. The target architecture description data 116 can characterize a constituent component list and a component connectivity. The component description data 118 can characterize components of the target SoS architecture. For example, the component description data 118 can characterize a component role or function, subsystem functional descriptions, subsystems internal connectivity, identify mission critical subsystems and/or component cost (e.g., component total cost or individual subsystem cost). The ADF generator 108 can be programmed to provide the ADF data 114 based on the architecture description data 116 and the component description data 118. By way of example, the architecture description data 116 and the component description data 118 can be generated based on user input at an input device 120. If cost data (absolute or relative) is available for the components of a system of the target SoS architecture it can be included in the ADF data 114 as part of the definition of each component. In some examples, the ADF data 114 can describe at least one target SoS architecture and at least one mission critical subsystem defined from knowledge for the target SoS architecture.

In some instances, the ADF data 114 can characterize combinations of mission critical subsystems and respective failure modes. Failure modes of the one or more mission critical subsystems can be identified (e.g., based on the user input at the input device 120) during a compilation of the architecture description data 116 and the component description data 118 and encoded into a failure model data structure by the ADF generator 108. Failure model data can be captured in an FMEA format that can be ingested by the ADF generator 108 and encoded into the failure model data structure for use by the vulnerability analyzer 110.

The vulnerability analyzer 110 can be programmed to model the target SoS architecture and apply vulnerability analysis techniques to the modeled target SoS architecture to identify potential cyber vulnerabilities in the target SoS architecture. The vulnerability analyzer 110 can output vulnerability analysis data 122 based on said vulnerability analysis techniques. The vulnerability analysis data 122 can characterize potential cyber-attack vectors and probabilities of such cyber-attacks causing an SoS based on the target SoS architecture to fail a mission. The vulnerability analysis data 122 can be provided to the GUI generator 112, which can be programmed to generate GUI display data 124, as described herein. The GUI display data 124 can be rendered on an output device 126 (e.g., a display). The GUI generator 112 can be programmed to provide an interactive user interface for visualization of cyber-attack vectors and probabilities of such cyber-attacks causing the SoS based on the target SoS architecture to fail the mission.

The GUI generator 112 can be programmed to provide GUI display data 124 that can be rendered as interactive graphics on the output device 126. For example, the GUI generator 112 can be programmed to generate GUI elements (e.g., check boxes, radio buttons, sliding scales, or the like) that a user can employ to visualize the target SoS architectures and cyber-attack vectors with respect to the target SoS architecture on the output device 126. In some examples, the GUI generator 112 can employ visualizations and decision aids 128 for user inspection of the target SoS architecture's topology and attack vector vulnerabilities. The GUI generator 112 can include interactive analysis tools 130 that allow for exploration of cyber vulnerabilities versus architecture variants in a search for cyber robustness. The interactive analysis tools 130 can include cost based visualizations enabling the identification of a Pareto Frontier for selection of cost effective SoS architecture variants if optional cost information is provided as part of the ADF data 114.

Figure 2:
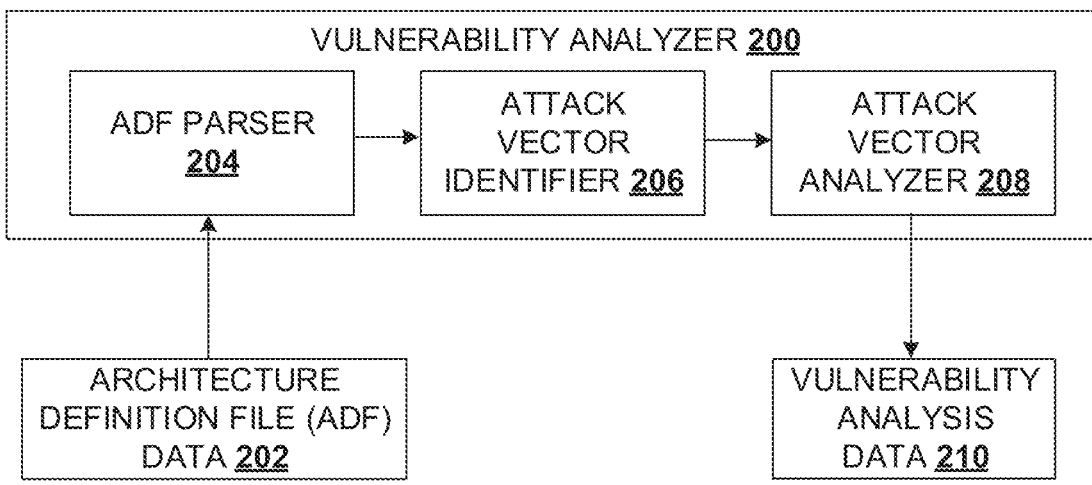
FIG. 2 illustrates an example of a vulnerability analyzer.

FIG. 2 illustrates an example of a vulnerability analyzer 200. The vulnerability analyzer 200 can be the vulnerability analyzer 110, as shown in FIG. 1. Thus, in some examples, reference can be made to FIG. 1 in the example of FIG. 2. The vulnerability analyzer 200 can be programmed to receive ADF data 202, which can be the ADF data 114, as shown in FIG. 1. The vulnerability analyzer 200 can employ an ADF parser 204. The ADF parser 204 can be programmed to process the ADF data 202 to construct internal data structures that model an architecture topology and constituent components. The internal data structures can include a target SoS architecture topology and constituent component data structures.

The ADF parser 204 can be programmed to map the target architecture definitions of the ADF data 202 into a data structure that models a topology of the target SoS architecture to a level of detail specified in the ADF data 202. The ADF parser 204 can be programmed to map mission critical subsystems into a failure model data structure. For example, the ADF parser 204 can be programmed to parse the ADF data 202 into an architecture topology data structure establishing a topological model of the target SoS architecture, and parsing of the identified mission critical subsystems into the failure model data structure. The GUI generator 112 can be employed to display on the output device 126 a visualization of the architecture topology modeled in the architecture topology data structure along with the identified mission critical subsystems modeled in the failure model data structure. The GUI generator 112 enables visualization of the defined architecture and its defined mission critical subsystems as well as provides interactive tools to conduct what-if type of evaluations of alternative architectures for an interactive exploration of the architectural trade space and associated cyber vulnerabilities. This exploratory approach to analyzing an architecture's cyber vulnerability enables the user to efficiently perform tradeoff analysis and identify the desired architecture from a set of variants for implementation before significant investment in the development of the architecture is made.

The vulnerability analyzer 200 can employ an attack vector identifier 206 to process the internal data structures to identify potential cyber-attack vectors that could result in a degradation of a system of the SoS based on the target SoS architecture, failure of the system of the SoS, or result in mission failure of the SoS. For example, the vulnerability analyzer 200 can identify potential cyber-attack vectors that cause a constituent component, subsystem, or specific combinations of constituent components and subsystems to deviate from normal operation during deployment of the SoS based on the target SoS architecture to an extent (e.g., a level) that results in the SoS from being inhibited or being unable to complete an objective (e.g., a mission). The attack vector identifier 206 can be programmed to identify potential cyber-attack vectors given the definition of the architecture topology and its identified mission critical subsystems. The attack vector identifier 206 can be programmed to add the identified potential cyber-attack vectors to the failure model data structure establishing mission (critical) failure modes.

In an example, the attack vector identifier 206 can be programmed to identify alone or more paths (in some instances all paths) of a fixed number of events. An event can correspond to a single action such as the attack moving from one component to the next or compromising the current internal component. A resulting potential cyber-attack vector can include a list of events that can occur as the attack traverses the target SoS architecture. In some examples, the attack vector identifier 206 can be programmed to identify the potential cyber-attack vectors randomly without a restriction of a fixed number of events. As such, the attack vector identifier 206 can be programmed to uncover more lengthy potential cyber-attacks which can be difficult to uncover in an exhaustive search. In yet even further examples, the attack vector identifier 206 can be programmed to compute event probabilities for each event. The event probabilities can represent a likelihood of a given event occurring. The event probabilities can be used to identify potential cyber-attacks which are more likely to occur than others.

The vulnerability analyzer 200 can include an attack vector analyzer 208. The attack vector analyzer 208 can be programmed to perform a probabilistic analysis of the potential cyber-attack vectors to compute the vulnerability analysis data 210. The potential cyber-attack vectors can be provided as part of vulnerability analysis data 210. In some examples, the vulnerability analyzer 200 can output the vulnerability analysis data 210 in a data format that can be ingested by third-party software applications for other types of analysis. The vulnerability analysis data 210 can be the vulnerability analysis data 122, as shown in FIG. 1. The attack vector analyzer 208 can be programmed to simulate the potential cyber-attack vectors to compute probabilistic cyber-attack performance metrics, which can be characterized by the vulnerability analysis data 210. The attack vector analyzer 208 can employ the probabilistic performance metrics to perform probabilistic analysis such as determining a likelihood of success of each potential cyber-attack vector and/or a likelihood of a mission failure of the SoS based on the target SoS architecture. The probabilistic cyber-attack performance metrics can be output in computer readable form for ingesting and processing by other computer analysis application software as well as visualized (e.g., via the GUI generator 112) on the output device 126 to allow for analysis of alternative SoS architectures for the SoS.

In some examples, the attack vector analyzer 208 can be programmed to rank order each computed probabilistic cyber-attack performance metric to provide a critical cyber-attack vulnerability ranking for the target SoS architecture. The results of the cyber-attack vulnerability ranking can be output as part of the vulnerability analysis data 210, in some instances in a computer readable form for ingesting and processing by other computer application programs as well as visualization on the output device 126. A priority scheme can be determined for addressing each identified vulnerability by the vulnerability analyzer and the evaluation of the vulnerability to determine if a potential cyber vulnerability requires an architecture change or can be managed as a risk to the target architecture if the potential cyber vulnerability cannot be managed as a risk to the target SoS architecture determine if it requires real-time intrusion monitoring and what the monitoring must be able to detect, if optional cost data (absolute or relative) is available for the components of the target SoS architecture, visually determine a tradeoff of the threat imposed by the cyber vulnerability against the cost of changing the architecture to mitigate the vulnerability.

By way of further example, the attack vector analyzer 208 can be programmed to simulate an attack by applying probabilities to the identified potential cyber-attack vector. Each potential cyber-attack vector can be made of a sequence of events and each event can have a probability of occurring. In an example, the probabilities can be assigned by the user (e.g., via the input device 120, as shown in FIG. 1) or could be read in from a database of probabilities compiled from other vulnerability analyses. The probability of compromising a given component of the target SoS architecture can be made large due to a known defect in that component. In another example, probabilities can be assigned via random distribution by the vulnerability analyzer 20, which can be useful for components with incomplete data.

In an example, the attack vector analyzer 208 can be programmed to implement the probabilistic analysis using a computational algorithm, such as a Monte Carlo algorithm (e.g., a simulation algorithm). In another example, the attack vector analyzer 208 can be programmed to implement the probabilistic analysis using artificial intelligence (AI) algorithms, such as rule-based expert systems, neural networks, or machine learning to evaluate the potential cyber-attack vectors. In yet even further examples, the attack vector analyzer 208 can be programmed to employ a combination of analysis techniques together with adjudication logic that selects a best result or fuses together multiple results into a single improved result (e.g., probability). Accordingly, in some instances, the attack vector analyzer 208 can be programmed to determine a probability for each cyber-attack vector indicative of a likelihood that a respective cyber-attack on the SoS based on the target SoS architecture would result in mission failure by the SoS or a system or subsystem being compromised beyond an acceptable level.

While the vulnerability analysis examples herein use a Monte Carlo probabilistic analysis approach, the system and methods described herein are not dependent on a specific embodiment of the analysis used, only that the analysis generates results that are probabilistically quantified. As such, the system and methods described herein can make use of any analysis techniques for computing a vulnerability probability including AI techniques, such as described herein. Moreover, the examples described herein should not be construed and/or limited to only analysis of communication systems based on a target SoS architecture. The systems and methods described herein can be used in military systems, commercial systems, consumer internet systems, business-to-business transaction systems, and internal corporate systems for cyber vulnerability analysis of an intended target SoS architecture for implementing said system.

Figure 3:
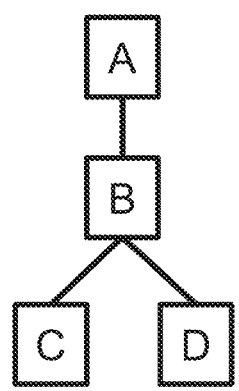
FIG. 3 illustrates an example of a model of a target SoS architecture.

FIG. 3 illustrates an example of a model of a target SoS architecture 300 for an SoS that can be generated by the vulnerability analyzer 110, as shown in FIG. 1, or the vulnerability analyzer 200, as shown in FIG. 2. Thus, in some examples, reference can be made to FIGS. 1-2 in the example of FIG. 3. The target SoS architecture 300 can be generated by the vulnerability analyzer 110 or 200 based on the ADF data 114, as shown in FIG. 1, or the ADF data 202, as shown in FIG. 2. The target SoS architecture 300 can be provided to the GUI generator 112 for rendering on the output device 126, as shown in FIG. 1. In some examples, the target SoS architecture 300 is provided as part of the vulnerability analysis data 122, as shown in FIG. 1, or the vulnerability analysis data 210, as shown in FIG. 2. The ADF parser 204 can be programmed to generate the target SoS architecture 300 based on the ADF data 202 or 114.

For example, the ADF data 114 or the ADF data 202 can include target architecture and constituent component definitions. The target architecture definition can include a constituent component list and a component connectivity (e.g., topology) description. The constituent component list can define components of the target SoS architecture. In the example of FIG. 3, the target SoS architecture 300 generated by the ADF parser 204 can include four (4) constituent components: A, B, C, and D. The ADP file data 202 or 114 can include connectivity descriptions defining how the constituent components are connected. In the example of FIG. 3, the connectivity descriptions can indicate that constituent component A connects to constituent component B, constituent component B connects to constituent component C, and constituent component D connects to constituent component D.

By way of further example, the constituent component definitions of the ADF data 114 or 202 can define (e.g., a functionality, characteristics, etc.) of each of the constituent components of the target SoS architecture 300 at a component abstractness level. The constituent component definitions can include a component role or functional description of the component, a subsystem list, subsystem functional descriptions, a subsystem internal connectivity (e.g., a topology), a mission critical subsystem list (e.g., subsystems that if a failure occurs will cause mission failure), and/or component cost and subsystem cost data. The component role or functional description can be a brief text description of the component for contextual identification within the target SoS architecture 300. The subsystem list can define the subsystems of the component in a list, which can be ordered based on ordering criteria. In some examples, not all subsystems of the component need to be identified in the subsystem list, only those that are to be analyzed. Subsystem functional descriptions can be text descriptions of the subsystem for identification in the target SoS architecture. Subsystem internal connectivity can be a description of the connectivity of each subsystem within the component. The mission critical subsystem list can identify the subsystems and/or specific combinations of subsystems that if compromised can result in a mission failure.

The component cost data of the constituent component can represent absolute cost data (e.g., in a fiat currency or cryptocurrency) or relative cost data. Relative cost data can be given in terms of a base component that has the defined value of 1.0. All other components of the target SoS architecture can be valued as fractional multiples of the base component. For example, the constituent component A can be defined as the base component with the cost of (A) equal to 1.0. All other constituent components can be evaluated with respect to the cost of constituent component A (or its relative complexity as a cost surrogate) and given values of [X.Y], wherein X is the whole multiplier and Y is the fractional multiplier of the base value of constituent component A. For this example, a relative cost of constituent component B equal to 1.5 would indicate that the constituent component B is 50% more costly (or 50% more complex) than constituent component A. Relative costs enable a cost-benefit analysis to be performed if absolute costs are not known. If any cost data (absolute or relative) is available the vulnerability analyzer 200 or 110 can be programmed to perform a cost-benefit analysis on the target SoS architecture. Results of the cost-benefit analysis can be provided as part of the vulnerability analysis data 122 or 210.

Figure 4:
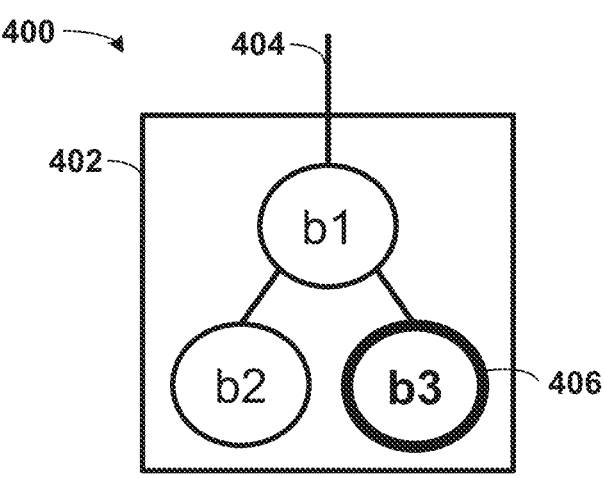
FIG. 4 illustrates an example of a model of an internal topology of a constituent component of a target SoS architecture.

FIG. 4 illustrates an example of a model of an internal topology 400 of a constituent component 400 of a target SoS architecture, such as the target SoS architecture 300, as shown in FIG. 3. The constituent component 400 can be the constituent component C or D, as shown in FIG. 3. Thus, in some examples, reference can be made to FIGS. 1-3 in the example of FIG. 4. In the example of FIG. 4, the constituent component 400 has three (3) subsystems b1, b2, and b3 but in other examples, the constituent component 400 can have more or less than three (3) subsystems. The constituent component 400 for the target SoS architecture 300 can be generated by the vulnerability analyzer 110 or 200 based on the constituent component definitions of the ADF data 114 or 202. In the example of FIG. 4, the subsystem b1 can have a connection 404 to external components, such as constituent component B, as shown in FIG. 3.

The subsystem b1 can connect to subsystem b2 and connect to subsystem b3. As described herein, the mission critical subsystem list can identify the subsystems and/or specific combinations of subsystems that if compromised could result in a mission failure. In the example of FIG. 4, the subsystem b3 is identified as a critical system, which if compromised can result in a mission failure. The subsystem b3 at 406 is identified as a critical system. In some examples, the subsystems b2 and b3 can be a combination of critical subsystems both of which must be compromised for mission failure. In these examples, the mission critical subsystem list can indicate that the subsystems b2 and b3 are critical subsystems. As described, the target SoS architecture 300 can be provided to the GUI generator 112 for rendering on the output device 126, as shown in FIG. 1. The internal topology 400 of the constituent component 400 can be rendered on the output device 126 and visually emphasized using the visualization and decision aids 128, such as via colors or other graphical indicators. For example, the subsystem b3 can be bolded at 406 in the rendering of the internal topology 400 on the output device 126 to indicate that the subsystem b3 is a critical system, as shown in FIG. 4.

Figure 5:
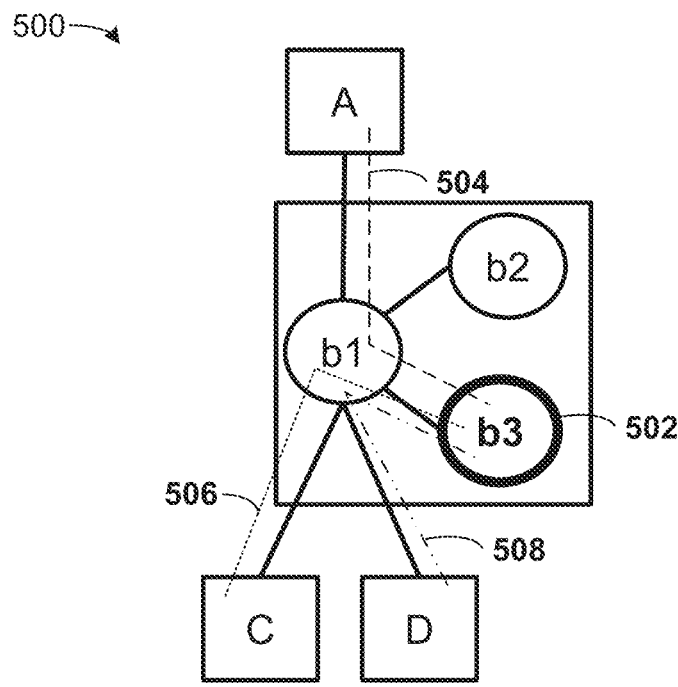
FIG. 5 illustrates an example of another model of a target SoS architecture.

FIG. 5 illustrates an example of a model of a target SoS architecture 500 with identified potential cyber vulnerability vectors. The target SoS architecture 500 can be generated by the vulnerability analyzer 110, as shown in FIG. 1, or the vulnerability analyzer 200, as shown in FIG. 2. In some examples, the target SoS architecture 500 corresponds to the target SoS architecture 300, as shown in FIG. 3. Thus, in some examples, reference can be made to FIGS. 1-4 in the example of FIG. 5. The target SoS architecture 500 includes a constituent component A and constituent component B. The constituent component A connects to constituent component B via a subsystem b1 of the constituent component B. The subsystem b1 also connects to constituent components C and D of the target SoS architecture 500. Internal to constituent component B, the subsystem b1 connects to subsystems b2 and b3. The subsystem b3 is identified at 502 as a mission-critical subsystem and failure of this subsystem can result in the mission failure of the SoS. For the methods employed by the system 100, not all constituent components and/or subsystems need to be defined to the same level of detail. The input device 120 can receive user data identifying target architecture constituent components, component subsystems, connectivity (topology), and mission-critical subsystems and/or combinations can be obtained from architectural documentation or interviews with individual architects.

By way of example, the vulnerability analyzer 110 or 200 can evaluate the target SoS architecture 500 to identify one or more potential cyber-attack vectors that could result in a mission failure of a SoS if implemented based on the target SoS architecture in a same or similar manner as described herein. With respect to the example of FIG. 5, the attack vector identifier 206 has identified three potential cyber-attack vectors 504, 506, and 508. A first potential cyber-attack vector 504 identifies a potential attack path starting with constituent component A being compromised, leading to the subsystem b1 being compromised, and ending with the subsystem b3 being compromised. A second potential cyber-attack vector 506 identifies a potential attack path starting with constituent component C being compromised, leading to the subsystem b1 being compromised, and ending with the subsystem b3 being compromised. A third potential cyber-attack vector 508 identifies a potential attack path starting with constituent component D, leading to the subsystem b1 being compromised, and ending with the subsystem b3 being compromised.

The attack vector analyzer 208 can be programmed to compute for each identified potential cyber-attack vector 504, 506, and 508 a probability that a given identified potential cyber-attack vector will actually result in the mission failure of the SoS based on the target SoS architecture 500. In some examples, the probability can be referred to as a mission failure rate for the SoS if implemented based on the target SoS architecture 500. For example, the attack vector analyzer 208 can be programmed to analyze the identified potential cyber-attack vectors 504, 506, and 508 using Monte Carlo analysis or another type of computational algorithm to estimate resultant failure rates (e.g., a probability of mission failure by the SoS based on the target SoS architecture 500). Accordingly, in some instances, the attack vector analyzer 208 can be programmed to provide probabilities that indicate a likelihood of a cyber-attack along a corresponding attack path is likely to succeed in reaching a critical system, that once compromised will result in objective failure of the SoS.

In some examples, the attack vector analyzer 208 can be programmed to determine an amount of acceptable probability of failure for the target SoS architecture given a cost of failure in terms of a fiat currency or human life. For example, the attack vector analyzer 208 can be programmed to identify a select potential cyber-attack vector of the potential cyber-attack vectors 504, 506, and 508 with a greatest probability. In other examples, the attack vector analyzer 140 can be programmed to identify the select potential cyber-attack vector 504, 506, and 508 by comparing each probability for each potential cyber-attack vector 504, 508 to a vulnerability threshold. The potential cyber-attack vector 504, 506, or 508 with the probability that is equal to or greater than the vulnerability threshold can be identified by the attack vector analyzer 208 (e.g., as part of the vulnerability analysis data 122, as shown in FIG. 1, or the vulnerability analysis data 208, as shown in FIG. 2) as the select potential cyber-attack vector.

In the example of FIG. 5, the attack vector analyzer 208 has determined that the potential cyber-attack vector 504 has an estimated mission failure rate of 3%, the potential cyber-attack vector 506 has an estimated mission failure rate of 7%, and the potential cyber-attack vector 508 has an estimated mission failure rate of 90%. Because the potential cyber-attack vector 508 has a greatest estimated mission failure rate relative to the potential cyber-attack vectors 504 and 506, the attack vector analyzer 208 can indicate in the vulnerability analysis data 122 or 208 that the potential cyber-attack vector 508 has a most significant vulnerability impact on the SoS based on the target SoS architecture. The vulnerability analysis data 122 or 208 can be rendered by the GUI generator 112 on the output device 126, as described herein.

In some examples, the attack vector analyzer 208 can be programmed to group identified potential cyber-attack vectors into respective categories based on cyber-attack vector grouping criteria. For example, the cyber-attack vector grouping criteria can indicate that potential cyber-attack vectors having respective estimated mission failure rates that are less than or equal to a first estimated mission failure rate threshold are to be associated with a first cyber-attack category, and potential cyber-attack vectors having respective estimated mission failure rates that are greater than or equal to the first estimated mission failure rate threshold but less than or equal to a second estimated mission failure rate threshold are to be associated with a second cyber-attack category. The cyber-attack vector grouping criteria can indicate that potential cyber-attack vectors having respective estimated mission failure rates that are greater than or equal to the second estimated mission failure rate threshold but less than a third estimate mission failure rate threshold are to be associated with a third cyber-attack category. The cyber-attack vector grouping criteria can indicate that potential cyber-attack vectors having respective estimated mission failure rates that are greater than or equal to the third estimated mission failure rate threshold are to be associated with a fourth cyber-attack category.

In some examples, the first cyber-attack category can identify potential cyber-attack vectors that have little to no impact on the SoS based on the target SoS architecture 500, the second cyber-attack category can identify potential cyber-attack vectors that can be risk-managed by processes and procedures (e.g., cyber-attack monitoring software), the third cyber-attack category can identify potential cyber-attack vectors that can be mitigated or eliminated by one or more minor changes to the target SoS architecture 500, and the fourth cyber-attack category can identify potential cyber-attack vectors that require significant changes to the target SoS architecture 500 for mitigation or elimination. A quantification of minor changes and significant changes are relative to the target SoS architecture being analyzed, its development timeline, and an anticipated cost of a change. For example, a change that requires a 1% increase in cost and/or schedule may be considered minor, but a change that requires a 25% increase in either cost and/or schedule may be considered significant.

The attack vector analyzer 208 can be programmed to provide potential cyber-attack vector grouping data characterizing the cyber-attack categories and grouping of potential cyber-attack vectors as part of the vulnerability analysis data 122 or 208. The GUI generator 112 can render the potential cyber-attack vector grouping data on the output device 126. The user can evaluate the rendered cyber-attack vector grouping data to define or set an acceptable level of vulnerability mitigation for the SoS based on the SoS architecture 500. For example, the user can determine that potential cyber-attack vector 508 requires mitigation based on the rendered cyber-attack vector grouping data on the output device 126, and update the SoS architecture 500 to eliminate the cyber-attack vector 508.

Figure 6:
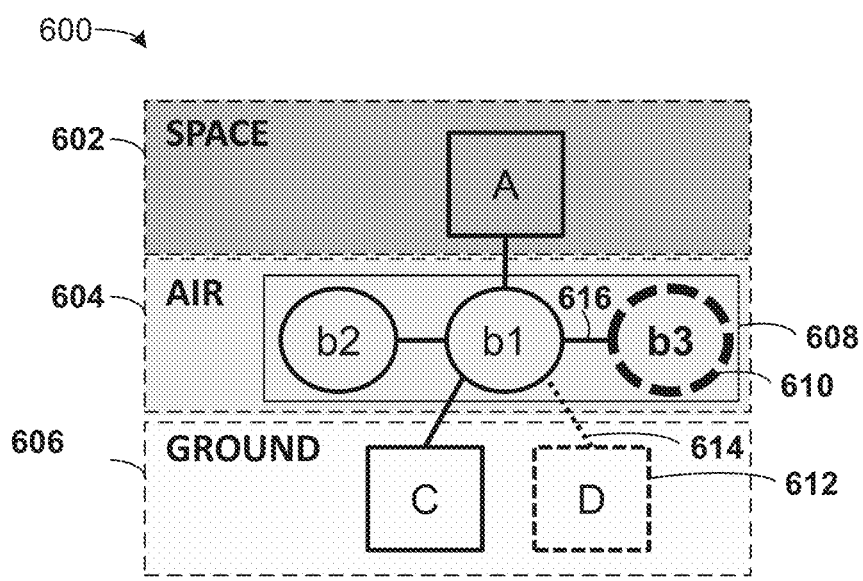
FIG. 6 illustrates an example of a model of a multi-domain target SoS architecture.

FIG. 6 illustrates an example of a model of a multi-domain target SoS architecture 600 for an SoS. The multi-domain target SoS architecture 600 can be generated by the vulnerability analyzer 110, as shown in FIG. 1, or the vulnerability analyzer 200, as shown in FIG. 2. Thus, in some examples, reference can be made to FIGS. 1-2 in the example of FIG. 6. For example, the multi-domain target SoS architecture 600 can include a space domain 602 (labeled as "SPACE"), an air domain 604 (labeled as "AIR"), and a ground domain 606 (labeled as "GROUND"). The space domain 602 can include a space component A, the air domain 604 can include an airborne component B identified at 608 in the example of FIG. 6, and the ground domain 606 can include ground components C and D.

The space component A can be representative of a communications satellite, and the airborne component B can be representative of a communications relay, and the ground components C and D can representative of a fixed site, and a mobile unit, respectively. The airborne component B can include three subsystems b1, b2, and b3. The subsystem b1 can be representative of a camera, the subsystem b2 can be representative of a radio transceiver, and the subsystem b3 can be representative of a communication relay unit that translates messages from one communications link to another for rebroadcast. An objective or mission of the target SoS architecture 600 can be to provide continuous communications connectivity between the satellite and the ground components A, C, and D.

In the example of FIG. 6, the attack vector analyzer 208 can be programmed to identify one or more potential cyber-attack vectors in the multi-domain target SoS architecture 600 for the SoS in a same or similar manner as described herein. The subsystem b3 can be an objective critical subsystem in the example of FIG. 6. The GUI generator 112 can be programmed to render the target SoS architecture 600 on the output device 126 with the subsystem b3 graphically differentiated at 610 from other components and subsystems to indicate that the subsystem b3 is a critical subsystem. The target SoS architecture 600 can be rendered on the output device 126 at 612 to graphically differentiate therein an entry for a potential cyber-attack through the mobile ground node D has a high probability of resulting in the subsystem b3 being compromised, and thus objective failure (e.g., a mission failure). The GUI generator 130 can render the interactive analysis tools 130 on the output device 126, which the user can interact with to display on the output device 126 a cyber-attack vulnerability summary table 700, as shown in FIG. 7, for the multi-domain target SoS architecture 600.

The cyber-attack vulnerability summary table 700 can be generated by the GUI generator 130 based on the vulnerability analysis data 122 or 210 provided by the vulnerability analyzer 110 or 200. The cyber-attack vulnerability summary table 700 can identify potential cyber-attacks that can result in a mission failure by the SoS, and identify components that were visited but not compromised or visited during a cyber-attack simulation (e.g., by the attack vector analyzer 208, as shown in FIG. 2) and had been compromised during the cyber-attack simulation. The cyber-attack vulnerability summary table 700 can further identify communication links traversed during the cyber-attack simulation and cyber-attack entry points into the multi-domain target SoS architecture 600. For example, the cyber-attack vulnerability summary table 700 indicates that the mobile ground node D is an entry point for a potential cyber-attack, that the ground component D and the airborne component B are visited and compromised, a communication link (identified in FIG. 6 at 614) been the ground component D and the airborne component B has been traversed and thus visited, and a communication link (identified in FIG. 6 at 616) between the subsystems b1 and b3 has been traversed and thus visited.

FIG. 8 is an example of a partial component description table 800. The partial component description table 800 can form part of the component description data 118 received by the ADF generator 108, as shown in FIG. 1. Thus, in some examples, reference can be made to FIGS. 1-2 in the example of FIG. 8. In the example of FIG. 8, the component description table 800 is organized (e.g., structured) in tabular form, however, in other examples, component description information therein can be arranged in different a manner. The partial component description table 800 can be provided based on a user input at the input device 120, as shown in FIG. 1.

In the example of FIG. 8, a first column 802 of the partial component description table 800 can identify component systems, such as a ground station, first and second aircrafts, and first and second satellites. A second column 804 of the partial component description table 800 can identify a role of a respective component system, and a domain to which the respective component system can belong. For example, as shown in FIG. 8, domains can include a ground domain, an air domain, and a space domain. The partial component description table 800 includes third and fourth columns 806 and 808 that can indicate a respective communication link type supported by each component system. For example, the ground station can support a line of sight (LOS) and beyond a line of sight (BLOS) link types. A fifth column 810 of the partial component description table 800 can indicate whether the respective component system has global positioning system (GPS) capabilities and whether the respective component system uses encrypted or non-encrypted GPS signals. For example, the first and second aircrafts receive encrypted GPS signals. In some examples, the ADF generator 108 can be programmed to process the component description data 118, which includes the partial component description table 800 to generate the ADF data 114, as shown in FIG. 1, or the ADF data 202, as shown in FIG. 1.

Figure 9:
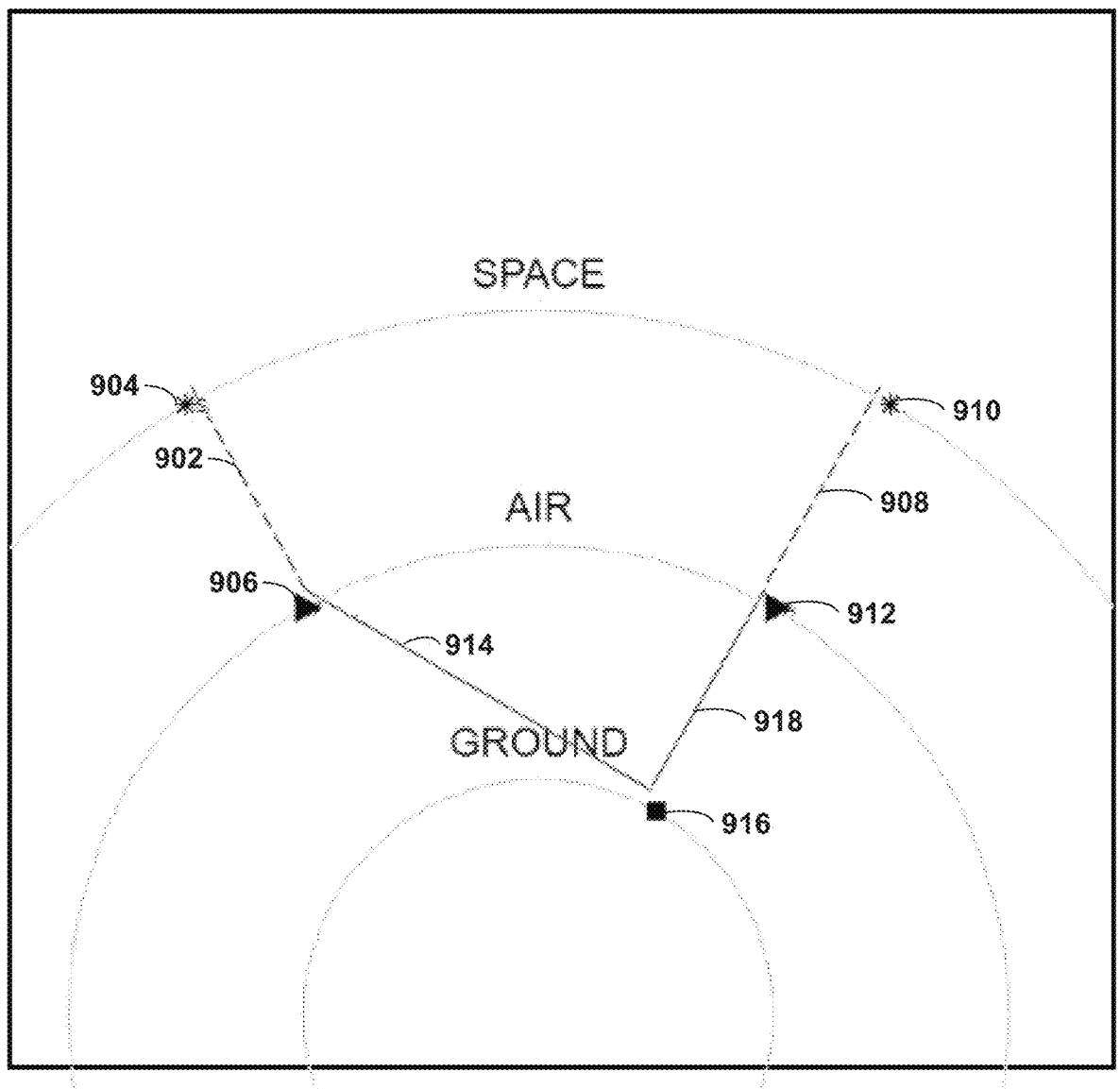
FIG. 9 illustrates an example of a model of a multi-domain communications architecture.

By way of further example, the vulnerability analyzer 110 or 200 can process the ADF data 114 or 202 to generate a model of a multi-domain communications architecture 900 for a communication system, as shown in FIG. 9 in a same or similar manner as described herein. The multi-domain communications architecture 900 can be rendered by the GUI generator 112 on the output device 126. The multi-domain communications architecture 900 can indicate types of communication links that can be established between respective component systems of the communication system.

In the example of FIG. 9, a first BLOS communication link 902 can be established between a first satellite 904 and a first aircraft 906. A second BLOS communication link 908 can be established between a second satellite 910 and a second aircraft 912. A first LOS communication 914 can be established between the first aircraft 906 and a ground station 916. A second LOS communication 918 can be established between the second aircraft 912 and the ground station 916. As shown in the multi-domain communications architecture 900, the first and second satellites 904 and 910 are located in a space domain ("labeled as "SPACE"), the first and second aircrafts 906 and 912 are located in an air domain (labeled as "AIR"), and the ground station 916 is located in a ground domain (labeled as "GROUND").

The vulnerability analyzer 110, as shown in FIG. 1, or the vulnerability analyzer 200, as shown in FIG. 2, can evaluate the multi-domain communications architecture 900 to identify potential cyber-attack vectors that are most likely to lead to a mission failure in a same or similar manner as described herein. For example, the vulnerability analyzer 110 can be programmed to simulate a cyber-attack at a random component system (e.g., the ground station 916). The simulated cyber-attack can disable sub-systems within the corresponding component systems being tested. For example, the simulated cyber-attack can disable communications between the first aircraft 906 and the ground station 916. The vulnerability analyzer 110 can probabilistically move from component system to component system in the multi-domain communications architecture 900 and traverse communication networks during a cyber-attack simulation in a same or similar manner as described herein.

The vulnerability analyzer 110 or 200 can output vulnerability analysis data 122, as shown in FIG. 1, or the vulnerability analysis data 210, as shown in FIG. 2 based on the cyber-attack simulation indicating a probability that a failure of a given component leads to mission failure, degradation of a mission, or allow the mission to be completed even if the given component fails as a result of a cyber-attack. In some examples, the vulnerability analysis data 210 can identify communication paths traversed during the simulation, links used, systems and subsystem disabled, and a mission status (e.g., mission failed, mission degraded, and mission passed). The GUI generator 112 can employ the vulnerability analysis data 122 or 210 to indicate graphically (e.g., by changing a color or transparency of the components of the multi-domain communications architecture 900) a frequency or an occurrence at which a given component system failed during the cyber-attack simulation on the multi-domain communications architecture 900. For example, component systems in the multi-domain communications architecture 900 that failed frequently during cyber-attack simulation can be changed to a red coloring to alert the user that this component is vulnerable to cyber-attacks.

Figure 10:
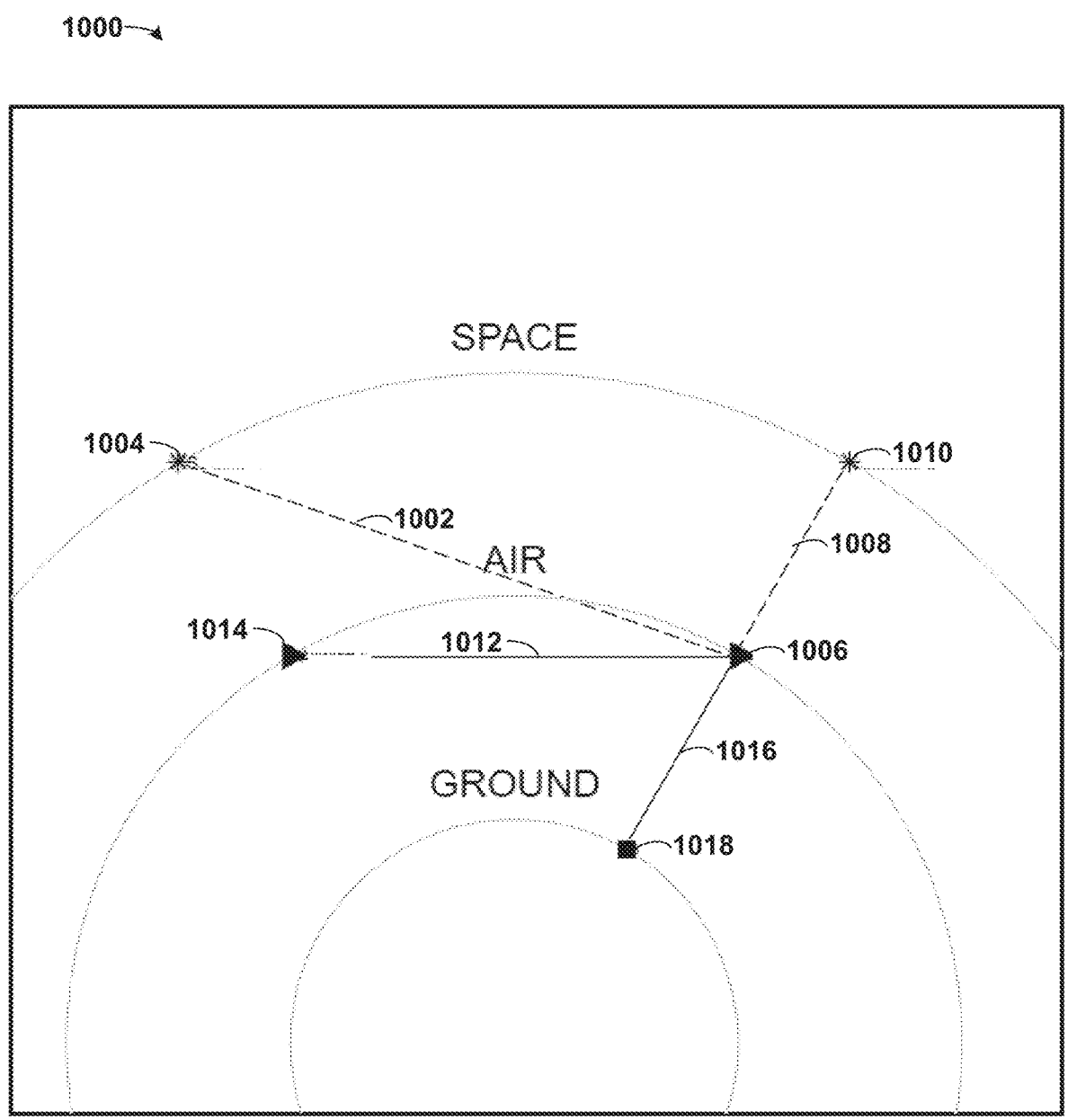
FIG. 10 illustrates an example of another model of a multi-domain communications architecture.

In some examples, the system 100 can compare different target SoS architectures for a target SoS to identify a select target SoS architecture for the target SoS with a lowest mission failure rate. In some examples, referred to herein as "a given example," the multi-domain communications architecture 900 can be referred to as a first multi-domain communications architecture 900. The system 100 can be employed to generate a model of a second multi-domain communications architecture 1000 for the communication system, as illustrated in FIG. 10.

The multi-domain communications architecture 1000 can indicate types of communication links that can be established between respective component systems of the communication system based on the multi-domain communications architecture 1000. In the example of FIG. 10, a first BLOS communication link 1002 can be established between a first satellite 1004 and a first aircraft 1006. A second BLOS communication link 1008 can be established between a second satellite 1010 and the first aircraft 1006. A first LOS communication 1012 can be established between the first aircraft 1006 and a second aircraft 1014. A second LOS communication 1016 can be established between the first aircraft 1006 and a ground station 1018. As shown in the multi-domain communications architecture 1000, the first and second satellites 1004 and 1010 are located in a space domain ("labeled as "SPACE"), the first and second aircrafts 1014 and 1006 are located in an air domain (labeled as "AIR"), and the ground station 1018 is located in a ground domain (labeled as "GROUND").

In the given example, the vulnerability analyzer 110 or 200 can simulate cyber-attacks with respect to each of the first and second multi-domain communications architectures 900 and 1000 and generate respective mission failure rates (e.g., as part of the vulnerability analysis data 122 or 210). The respective mission failure rate can be evaluated by the user or in some instances by the vulnerability analyzer 110 or 200 to identify a select multi-domain communications architecture for the communication system with a lowest mission failure rate. For example, if the first multi-domain communications architecture 900 has a 7% mission failure rate and the second multi-domain communications architecture 900 has a 23% mission failure rate, the vulnerability analyzer 110 or 200 can recommend on the output device 126 (e.g., via the GUI generator 112) the first multi-domain communications architecture 900 for use in the implementation of the communication system.

FIG. 11 illustrates an example of a FMEA table 1100. The FMEA table 1110 illustrates types of failures that can result from a cyber-attack of an individual element or subsystem of a target SoS architecture, for example, as described herein. Thus, in some examples, reference can be made to FIGS. 1-2 in the example of FIG. 11. As described herein, the FMEA table 1100 can be processed by the ADF generator 108, and encoded into a failure model data structure for use by the vulnerability analyzer 110 or 200. In some instances, the failure model data structure can be provided as part of the ADF data 114 to the vulnerability analyzer 110 or 200.

Figure 12:
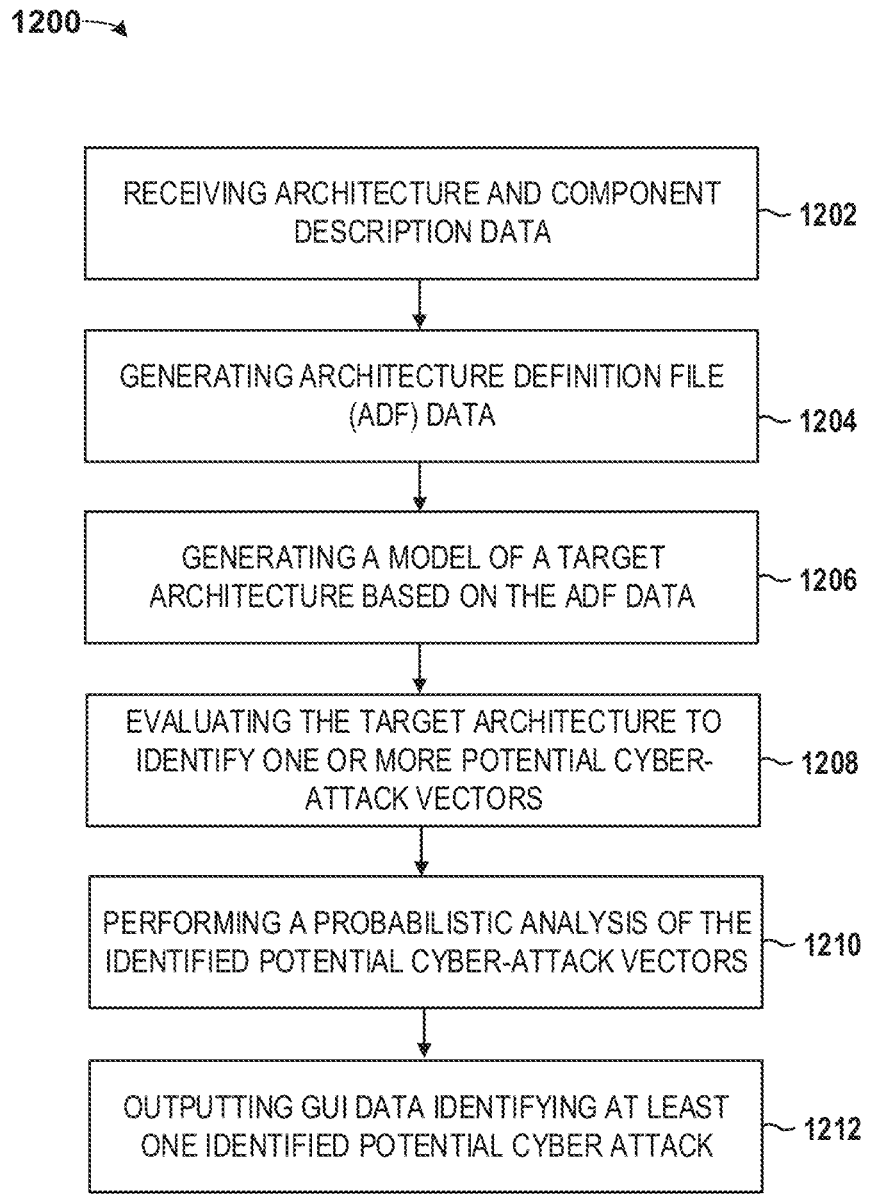
FIG. 12 illustrates an example method for analyzing cyber vulnerabilities of an SoS based on a target SoS architecture.

In view of the foregoing structural and functional features described above, an example method will be better appreciated with reference to FIG. 12. While, for purposes of simplicity of explanation, the example method of FIG. 12 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 12 illustrates an example method 1200 for analyzing cyber vulnerabilities of a SoS based on a target SoS architecture. The method 1200 can be implemented by the vulnerability analyzer 110, as shown in FIG. 1, or the vulnerability analyzer 200, as shown in FIG. 1. In some examples, the target SoS architecture is one of the target SoS architectures described herein. Thus, in some examples, reference can be made to FIGS. 1-11 in the example of FIG. 12.

The method 1200 can begin at 1202 by receiving architecture description data (e.g., the architecture description data 116, as shown in FIG. 1) and component description data (e.g., the component description data 118, as shown in FIG. 1). The architecture description data can be defined along with an identification of all mission-critical subsystems and/or subsystem combinations by evaluating architectural documentation and knowledge provided by one or more system engineers. The component description data can define all the constituent components, component subsystems, and topologies. In some examples, the component description data is logically organized in tabular form. The component description data can include for example the partial component description table 800, as shown in FIG. 8.

At 1204 generating ADF data (e.g., the ADF data 114, as shown in FIG. 1, or the ADF data 202, as shown in FIG. 12) based on the architecture and component description data. The ADF data can be generated by the ADF generator 108, as shown in FIG. 1. For example, the ADF data can be generated to include at least first and second data structures. The first data structure can characterize a topology of the target SoS architecture and the second data structure can characterize each constituent component of the target SoS architecture. At 1206, generating a model of a target SoS architecture based on the ADF data. The target SoS architecture can be generated by the ADF parser 204, as shown in FIG. 2. At 1208, the target SoS architecture can be evaluated to identify one or more potential cyber-attack vectors. At 1210, performing a probabilistic analysis of the potential cyber-attack vectors to compute a probability for each cyber-attack vector indicative of a likelihood that a respective cyber-attack would result in a mission failure (e.g., mission failure) by the SoS based on the target SoS architecture. At 1212, the method 1200 can include outputting GUI display data (e.g., the GUI display data 124, as shown in FIG. 1) on an output device (e.g., the output device 126) for updating of the target SoS to prevent (e.g., eliminate) at least one identified potential cyber-attack vector.

Figure 13:
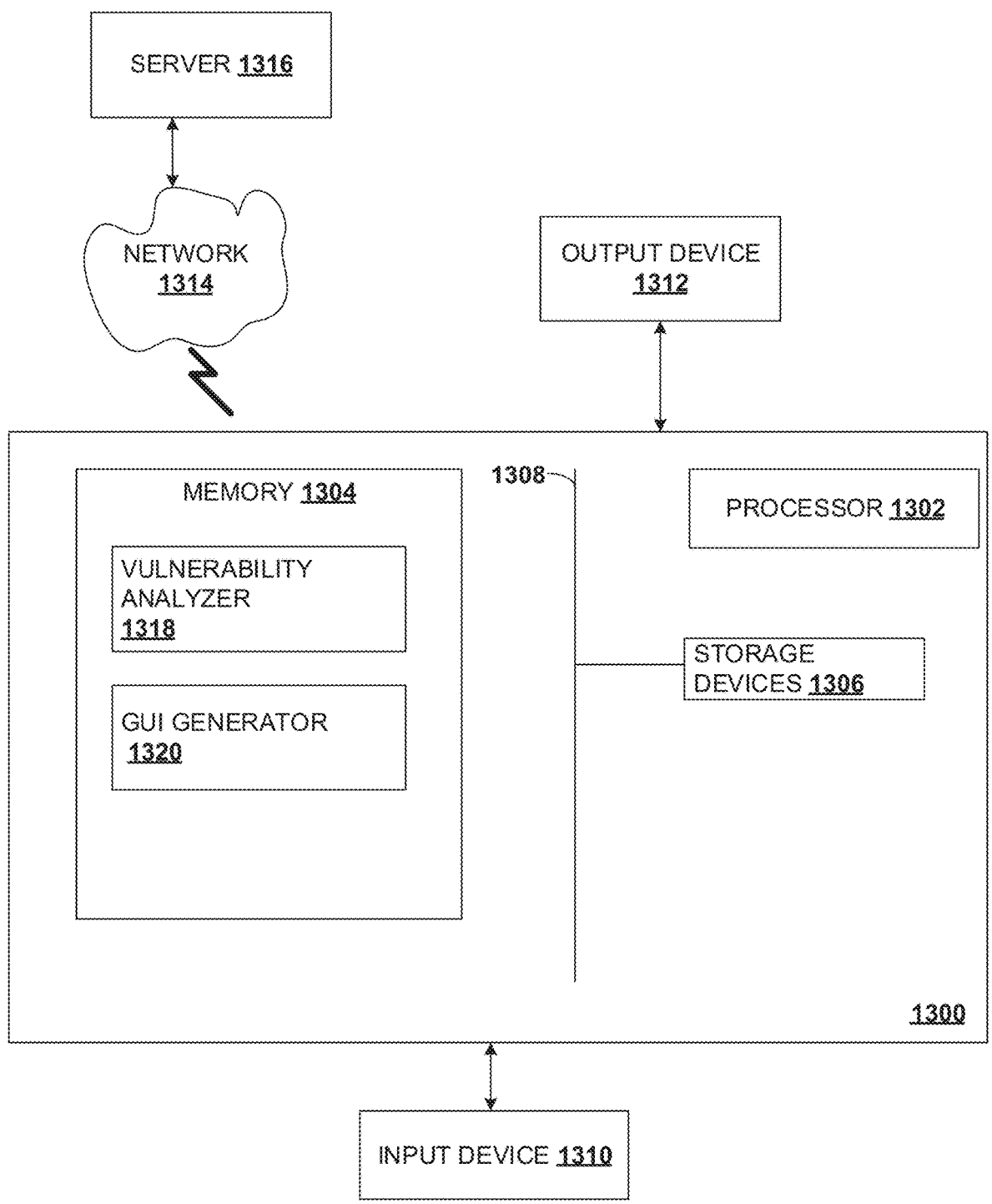
FIG. 13 illustrates an example of a computing system employable to execute analysis of a target SoS architecture for cyber-attack vulnerabilities.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that include at least the minimum processing power, memory and input and output device(s) to perform one or more embodiments. As shown in FIG. 13, the computing system 1300 can include a computer processor 1302, memory 1304 (e.g., RAM, cache memory, flash memory, etc.), one or more storage devices 1306 (e.g., a solid state drive, a hard disk drive, an optical drive such as a compact disk (CD) drive or digital versatile disk (DVD) drive, a flash memory stick, etc.) and numerous other elements and functionalities. The computer processor 1302 may be an integrated circuit for processing instructions. For example, the computer processor 1302 may be one or more cores, or micro-cores of a processor. Components of the computing system 1300 can communicate over a data bus 1308.

The computing system 1300 may also include an input device 1310, such as any combination of one or more of a touchscreen, keyboard, mouse, microphone, touchpad, electronic pen, or any other input device. The input device 812 can be the input device 120, as shown in FIG. 1. Further, the computing system 1300 can include an output device 1312, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. The output device 1312 can be the output device 126, as shown in FIG. 1.

In some examples, such as a touch screen, the output device 1312 can be the same physical device as the input device 1310. In other examples, the output device 1312 and the input device 1310 can be implemented as separate physical devices. The computing system 1300 can be coupled to a network 1314 (e.g., a local area network (LAN), a wide area network (WAN) such as the Internet, a mobile network, or any other type of network) via a network interface (not shown). The input device 1310 and output device(s) 1312 can be coupled locally and/or remotely (e.g., via the network 1312) to the computer processor 1302, the memory 1304 and/or the storage device 1306. Many different types of computing systems exist, and the input device 1310 and the output device 1312 can take other forms.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 1300 can communicate with a server 1316 via the network 1314. The memory 1304 can include a plurality of applications and/or modules that can be employed to implement SoS architecture analysis techniques as described herein. More particularly, the memory 1304 can include a vulnerability analyzer 1318 and a GUI generator 1320. The vulnerability analyzer 1318 can be the vulnerability analyzer 110, as shown in FIG. 1, or the vulnerability analyzer 200, as shown in FIG. 2, and the GUI generator 1320 can be the GUI generator 112, as shown in FIG. 1.

Further, one or more elements of the computing system 1300 can be located at a remote location and coupled to the other elements over the network 1314. Additionally, some examples can be implemented on a distributed system having a plurality of nodes, where each portion of an embodiment can be located on a different node within the distributed system. In one example, the node in the example of FIG. 13 corresponds to a distinct computing device. Alternatively, the node can correspond to a computer processor with associated physical memory. The node can alternatively correspond to a computer processor or micro-core of a computer processor with shared memory and/or resources.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A computer implemented method comprising:
   receiving architecture description data and component description data for a system-of-systems (SoS), wherein the component description data characterizes a function of components of the SoS and internal connectivity between subsystems forming components of the SoS;
   generating architecture definition file (ADF) data based on the architecture and component description data, wherein the ADF data identifies a connectivity of subcomponents of components of the SoS;
   generating a model of a target SoS architecture for the SoS based on the ADF data;
   evaluating the target SoS architecture for the SoS to identify one or more cyber-attack vectors with respect to the target SoS architecture;
   executing a probabilistic analysis of the cyber-attack vectors to compute a probability for each cyber-attack vector indicating that a respective cyber-attack results in a mission failure by the SoS based on the target SoS architecture;
   causing the at least one identified cyber-attack vector to be eliminated by updating the target SoS architecture for the SoS based on an associated computed probability for the at least one identified cyber-attack vector, such that the SoS implemented based on the updated target SoS architecture has a reduced vulnerability to a cyber-attack than the SoS implemented based on the target SoS architecture; and
   generating output graphical user interface (GUI) display data for visualization on output device, the GUI display data including each identified cyber-attack vector and associated computed probability.

2. The computer implemented method of claim 1, wherein the ADF data describes the target SoS architecture and includes a list of constituent components of the target SoS architecture, connectivity for the constituent components, and definitions for: the constituent components, internal subsystems, subsystem connectivity, and identification of mission critical subsystems.

3. The computer implemented method of claim 1, wherein generating the model of the target SoS architecture for the SoS comprises:
   extracting target architecture definitions from the ADF data into an architecture topology data structure to establish a topological model of the target SoS architecture; and
   extracting constituent component definitions from the ADF data into a component definitions data structure;
   extracting information identifying mission critical subsystems and/or combinations of critical subsystems of the SoS defined in the ADF data as mission critical into a failure model data structure; and
   generating the model of the target SoS architecture based on the architecture topology data structure, the component definitions data structure, and the failure model data structure.

4. The computer implemented method of claim 3, wherein executing the probabilistic analysis of the cyber-attack vectors comprises simulating the cyber-attack vectors through the target SoS for the SoS to compute probabilistic cyber-attack performance metrics that include each associated probability for each cyber-attack vector.

5. The computer implemented method of claim 4, wherein the simulating of the cyber-attack vectors through the target SoS for the SoS is implemented using a computational algorithm.

6. The computer implemented method of claim 4, wherein the simulating of the cyber-attack vectors through the target SoS for the SoS is implemented using an artificial intelligence algorithm.

7. The computer implemented method of claim 4, further comprising ranking-ordering each computed probability for each cyber-attack vector to generate a rank-ordering list to identify a given cyber-attack vector that causes the SoS implemented based on the target SoS to fail an objective.

8. The computer implemented method of claim 4, further comprising grouping identified cyber-attack vectors into respective categories based on cyber-attack vector grouping criteria.

9. The computer implemented method of claim 8, wherein the cyber-attack vector grouping criteria includes at least a first cyber-attack category, a second cyber-attack category, and a third cyber-attack category, each of the identified cyber-attack vectors being associated with a respective one of the first, second, and third cyber-attack categories.

10. The computer implemented method of claim 8, wherein the first cyber-attack category is indicating cyber-attack vectors that have no impact on the SoS based on the target SoS in implementing an objective of the SoS, the second cyber-attack category is indicating cyber-attack vectors that are to be risk-managed by processes and procedures during employment of the SoS based on the target SoS, and the third cyber-attack category identifies cyber-attack vectors that are to be eliminated by one or more changes to the target SoS architecture that removes each identified cyber-attack vector associated with the third cyber-attack category.

11. The computer implemented method of claim 10, wherein the model is a first model, the target SoS architecture is a first target SoS architecture for the SoS and the ADF data is first ADF data, the computer implemented method further comprising:
generating vulnerability analysis data for the first target SoS architecture characterizing the probability for each cyber-attack vector with respect to the first target SoS architecture;
receiving additional architecture description data and component description data for the SoS;
generating second ADF data based on the additional architecture and component description data;
generating a second model of a second target SoS architecture for the SoS based on the second ADF data;
evaluating the second target SoS architecture for the SoS to identify one or more cyber-attack vectors with respect to the second target SoS architecture; and
executing a probabilistic analysis of the cyber-attack vectors to compute a probability for each cyber-attack vector indicating that a respective cyber-attack would result in a mission failure by the SoS based on the second target SoS; and
generating vulnerability analysis data for the second target SoS architecture characterizing the probability for each cyber-attack vector with respect to the second target SoS architecture.

12. The computer implemented method of claim 11, further comprising evaluating the vulnerability analysis data for each of the first and second target SoS architecture to identify a target SoS architecture for the SoS that has a further reduced number of cyber-attack vulnerabilities that could result in the SoS failing an objective.

13. A system comprising:
memory to store machine-readable instructions and architecture definition file (ADF) data, wherein the ADF data identifies a connectivity of subcomponents of components of a target system of systems (SoS) and the ADF data is based on component description data that characterizes a function of components of the target SoS, and internal connectivity between subsystems forming components of the SoS; and
one or more processors to access the memory and execute the machine-readable instructions, the machine-readable instructions comprising a vulnerability analyzer comprising:
an ADF parser that is programmed to generate a model of the target SoS architecture for an SoS based on the ADF data;
an attack vector identifier that is programmed to evaluate the target SoS architecture for the SoS to identify one or more cyber-attack vectors with respect to the target SoS architecture;
an attack vector analyzer that is programmed to execute a probabilistic analysis of the cyber-attack vectors to compute a probability for each cyber-attack vector indicating that a respective cyber-attack results in a mission failure by the SoS based on the target SoS architecture, wherein at least one identified cyber-attack vector is eliminated by updating the target SoS architecture for the SoS based on an associated computed probability for the at least one identified cyber-attack vector, such that the SoS implemented based on the updated target SoS architecture has a reduced vulnerability to a cyber-attack than the SoS implemented based on the target SoS architecture; and
a graphical user interface (GUI) generator that is to generate GUI display data for visualization on an output device, the GUI display data including each identified cyber-attack vector and associated computed probability.

14. The system of claim 13, wherein the ADF parser is programmed to:
extract target architecture definitions from the ADF data into an architecture topology data structure to establish a topological model of the target SoS architecture; and
extract constituent component definitions from the ADF data into a component definitions data structure;
extract information identifying mission critical subsystems and/or combinations of critical subsystems of the SoS defined in the ADF data as mission critical into a failure model data structure; and
generate the model of the target SoS architecture based on the architecture topology data structure, the component definitions data structure, and the failure model data structure.

15. The system of claim 14, wherein the attack vector analyzer is programmed to execute the probabilistic analysis of the cyber-attack by simulating the cyber-attack vectors through the target SoS for the SoS to compute each probability for each cyber-attack vector.

16. The system of claim 15, wherein the attack vector analyzer is programmed to rank-order each computed probability for each cyber-attack vector to generate a rank-ordering list to identify a given cyber-attack vector that causes the SoS implemented based on the target SoS to fail an objective.

17. A non-transitory machine-readable medium having machine-readable instructions, the machine-readable instructions comprising:
architecture definition file (ADF) generator that is to generate ADF data based on architecture and component description data characterizing a function of components of a target system-of-systems (SoS), and internal connectivity between subsystems forming components for the target SoS architecture, wherein the ADF data identifies a connectivity of subcomponents of the target SoS; and a vulnerability analyzer that is to:
generate a model of the target SoS architecture for an SoS based on the ADF data;
evaluate the target SoS architecture for the SoS to identify one or more cyber-attack vectors with respect to the target SoS architecture;
execute a probabilistic analysis of the cyber-attack vectors to compute a probability for each cyber-attack vector indicating that a respective cyber-attack results in a mission failure by the SoS based on the target SoS architecture, wherein a given identified cyber-attack vector is eliminated by updating the target SoS architecture for the SoS based on an associated computed probability for the given identified cyber-attack vector, such that the SoS implemented based on the updated target SoS architecture has a reduced vulnerability to a cyber-attack than the SoS implemented based on the target SoS architecture;
generate output graphical user interface (GUI) display data for visualization on output device, the GUI display data including each identified cyber-attack vector and associated computed probability.

18. The non-transitory machine-readable medium of claim 17, the machine-readable instructions further comprising rank-ordering each computed probability for each cyber-attack vector to generate a rank-ordering list to identify the given cyber-attack vector that causes the SoS implemented based on the target SoS to fail an objective and displaying on the GUI the rank-ordering list.

* * * * *